US012523458B2

(12) United States Patent
Moser

(10) Patent No.: US 12,523,458 B2
(45) Date of Patent: Jan. 13, 2026

(54) SKEIN MEASURING AND DISPENSING TOOL

(71) Applicant: Matthew Moser, Clearwater, KS (US)

(72) Inventor: Matthew Moser, Clearwater, KS (US)

( * ) Notice: Subject to any disclaimer, the term of this patent is extended or adjusted under 35 U.S.C. 154(b) by 322 days.

(21) Appl. No.: 18/089,828

(22) Filed: Dec. 28, 2022

(65) Prior Publication Data

US 2023/0145510 A1 May 11, 2023

(51) Int. Cl.
*G01B 3/04* (2006.01)
*B65H 49/30* (2006.01)

(52) U.S. Cl.
CPC ............... *G01B 3/04* (2013.01); *B65H 49/30* (2013.01); *B65H 2701/31* (2013.01)

(58) Field of Classification Search
CPC ....... G01B 3/04; B65H 49/30; B65H 2701/31
See application file for complete search history.

(56) References Cited

U.S. PATENT DOCUMENTS 84,156 A 11/1868 Baker
224,401 A * 2/1880 Derickson ................ G01B 3/08 33/809
556,592 A 3/1896 Trachsel
1,310,741 A 7/1919 Cook
1,334,145 A * 3/1920 Eaton ........................ B43L 7/00 33/483
1,539,016 A 5/1925 Mizuno
2,138,299 A 11/1938 Gruebel
2,423,533 A 7/1947 Turner
2,456,676 A * 12/1948 Chowns .................... B43L 7/00 116/323
2,542,222 A 2/1951 Welch
(Continued)

FOREIGN PATENT DOCUMENTS

WO WO 1999/062363 9/1999

OTHER PUBLICATIONS

"Choosing the Best Yarn Winder and Yarn Swift", Travis Romine, filloryyarn.com, Jun. 18, 2021; https://filloryyarn.com/blogs/news/choosing-the-best-yarn-ball-winder-andswift.
(Continued)

*Primary Examiner* — Kristina M Deherrera
*Assistant Examiner* — Tania Courson
(74) *Attorney, Agent, or Firm* — Kenneth H. Jack; Davis & Jack, L.L.C.

(57) ABSTRACT

A skein measuring and dispensing tool including an oblongated base having a substantially centrally positioned axle channel; left and right travel slots within the oblongated base, the left and right travel slots respectively extending leftwardly and rightwardly from the axle channel; left and right spindles slidably mounted upon the oblongated base, the left and right spindles being adapted for respective movement along the left and right travel slots; left and right series of graduations, the left series' graduations being arrayed leftwardly from the axle channel and the right series' being arrayed rightwardly from the axle channel; and left and right pointers respectively connected to the left and right spindles, the pointers being positioned for, upon the movements of the left and right spindles along the left and right travel slots, successively aligning with graduations among the left and right series of graduations.

10 Claims, 8 Drawing Sheets

(56) References Cited

U.S. PATENT DOCUMENTS

| | | | | | |
|---|---|---|---|---|---|
| 2,545,744 | A * | 3/1951 | Nell | B65H 49/30 | 242/118.5 |
| 2,554,897 | A * | 5/1951 | Chapman | D06B 23/04 | 242/127 |
| 3,215,363 | A | 11/1965 | Dudascik | | |
| 3,223,440 | A * | 12/1965 | Rosenzweig | D04D 7/10 | 223/46 |
| 3,309,038 | A | 3/1967 | Greaney | | |
| 3,794,263 | A | 2/1974 | Delerue | | |
| 3,816,888 | A | 6/1974 | Rather | | |
| 3,885,754 | A | 5/1975 | Delerue | | |
| 3,902,678 | A | 9/1975 | Lussie et al. | | |
| 3,946,958 | A | 3/1976 | Chavis | | |
| 3,971,525 | A | 7/1976 | Winslow | | |
| 4,116,403 | A | 9/1978 | Ikeda | | |
| 4,337,578 | A | 7/1982 | Seals | | |
| 4,454,968 | A * | 6/1984 | StLawrence | D04D 7/10 | 223/46 |
| 4,779,817 | A | 10/1988 | Bjork | | |
| 5,356,056 | A * | 10/1994 | Teuten | D04D 7/10 | 223/46 |
| 5,411,188 | A * | 5/1995 | Teuten | D04D 7/10 | 223/46 |
| 5,509,212 | A * | 4/1996 | Henricksen | B43L 13/201 | 33/483 |
| 5,582,360 | A | 12/1996 | Herman | | |
| 5,938,134 | A | 8/1999 | Shields et al. | | |
| 9,284,155 | B2 | 3/2016 | Stanton | | |
| 10,000,360 | B2 * | 6/2018 | Stanton | B65H 75/4476 | |
| 11,161,365 | B1 * | 11/2021 | Garza | B43L 7/02 | |
| 2005/0115091 | A1 * | 6/2005 | Harris | E04F 21/0076 | 33/461 |
| 2006/0143934 | A1 * | 7/2006 | Perry | G09B 23/04 | 33/494 |
| 2007/0204476 | A1 * | 9/2007 | Brothers | B26B 29/06 | 33/483 |
| 2017/0036365 | A1 * | 2/2017 | Darwin | B26B 29/06 | |
| 2020/0001486 | A1 | 1/2020 | Matkovich | | |

OTHER PUBLICATIONS

"Knitter's Pride Signature Series Mega Wool Winder", yarn.com https://www.yarn.com/products/knitters-pride-signature-series-mega-woolwinder? last viewed Jul. 7, 2021.

"Paradise Fibers Super Swift II", ParadiseFibers.com https://www.paradisefibers.com/products/paradise-fibers-super-swift-ii? last viewed Jul. 7, 2021.

* cited by examiner

SKEIN MEASURING AND DISPENSING TOOL

FIELD OF THE INVENTION

This invention relates to apparatus which are adapted for measuring the lengths of yarn or cordage while configured as a multi-looped or wound skein. More particularly, this invention relates to such apparatus which are further adapted for dispensing the yarn or cordage from the wound skein.

BACKGROUND OF THE INVENTION

Rotatable yarn swifts are known to be capable of receiving and supporting a skein of yarn, string, cordage, or light rope. (References below to yarn should be considered as being broadly representative to all such materials.) In many circumstances, it is desirable to accurately estimate the length of yarn which has been wound into such skein. However, conventional yarn swifts typically are incapable of measuring the length of yarn within a skein which has been received upon the yarn swift.

The instant inventive skein measuring and dispensing tool solves or ameliorates such defects and deficiencies by providing a specialized base and spindles combination incorporating special adaptations which allow the tool to perform functions of measuring the length of a skein of yarn received upon the tool, and progressively dispensing the yarn from the skein.

BRIEF SUMMARY OF THE INVENTION

A first structural component of the instant inventive skein measuring and dispensing tool comprises an oblongated base, preferably having a substantially flat bottom or lower surface. In a suitable embodiment, the oblongated base may comprise a length of wood, or may be suitably alternatively composed of other materials such as plastic or metal.

In a preferred embodiment of the instant inventive tool, the oblongated base component has left and right ends, and has a mid-line or midpoint between such ends at which an axle channel component is presented. Such axle channel component preferably passes completely through the base from its upper side to its lower side.

Further structural components of the instant inventive tool comprise left and right travel slots which extend into the oblongated base. In a preferred embodiment, the left and right travel slots respectively extend leftwardly and rightwardly from the central axle channel and respectively toward the base's left and right ends. Each of the left and right travel slots preferably opens both upwardly at the upper side of the oblongated base and downwardly at its lower side, such axle channel configurations advantageously allowing vertically extending spindle mounting bolts or screws to pass vertically therethrough and to travel leftwardly and rightwardly therealong. The left and right travel channel components may suitably alternatively extend into and open at side walls of the base, such alternative channels similarly extending leftwardly and rightwardly therealong from the base's centrally positioned axle channel.

Further structural components of the instant inventive skein measuring and dispensing tool comprise left and right spindles which extend upwardly from the base and are slidably mounted thereon for selective movements along and positioning upon the base. In a preferred embodiment, the spindles are conical to facilitate smooth dispensation of yarn. The spindles' sliding movements along the base are preferably guided by and are limited by the left and right travel slots.

Further structural components of the instant inventive tool comprise left and right series of graduations, each graduation among said series being fixedly attached to and displayed upon the oblongated base. The graduations in combination with numeric indicia placed in series adjacent to the graduations function as and constitute yarn length indicia. In the preferred embodiment, the left series graduations are arrayed upon a side wall of the oblongated base, such graduation array extending leftwardly from the axle channel. The tool's right series of graduations component is preferably oppositely arrayed rightwardly along said side wall. In the preferred embodiment of the instant invention, the left and right series of graduations components substantially identically mirror each other with respect to the central axle channel, such mirroring characteristic allowing both small and large skeins of yarn received by the tool to remain substantially centrally positioned upon the tool during measuring.

Further structural components of the instant inventive tool comprise left and right pointers which are respectively connected to or displayed upon the left and right spindles, such pointers constituting measurement indicia which necessarily move with the spindles in relation to the base and the graduation arrays. In a preferred embodiment, the left and right pointers are positioned for, upon the movements of the left and right spindles along the left and right travel slots, successively aligning with graduations among the left and right series of graduations. Centimeter or inches indicia are preferably adjacently arrayed along the graduation arrays so that, upon placement of a skein of yarn about the spindles, and upon sliding movements of the spindles away from each other within the skein of yarn, the pointers may point to inch or centimeter indicia and thereby signify the length of each loop of yarn within the skein.

In a preferred mode of operation of the instant inventive tool, that the spindles and their pointers are mirroringly moved away from each other within a skein to be measured, such motions being guided by the base's travel slots. Such mirroring movements of the spindles advantageously radially balances the positions of the spindles along the length of the oblongated base. Such radial balancing of the spindles advantageously allows the oblongated base and the spindles to rotate about the axle channel in a balanced fashion. The tool's facilitation of balanced rotation advantageously allows the tool to dispense the yarn from the skein in a balanced rotating fashion.

The sliding motions of the tool's spindles along the base's travel slots are preferably facilitated by provisions of left and right slide plates, each slide plate overlying the upper surface of the oblongated plate and respectively underlie base or lower ends of the left and right spindles. During the movements of the spindles along the travel slots, the slide plates preferably move with the spindles with lower surfaces of the plates slidably contacting the base. In a preferred embodiment, the left and right pointers are respectively formed integrally with and extend from side edges of the left and right slide plates.

Further structural components of the instant inventive skein measuring and dispensing tool comprise left and right screw and threaded socket combinations. In the preferred embodiment, said combinations' threaded sockets are internally helically threaded, and open downwardly from the lower ends of the spindles, such sockets being respectively embedded within base or lower ends of the left and right spindles. The screw components of such combinations preferably respectively extend upwardly through the left and right travel slots to threadedly engage the helically threaded sockets. Loosening or unscrewing of such screw and threaded socket combinations allow the spindles and their slide plates to freely slidably move along the length of the oblongated base. Opposite screw tightening of such combinations advantageously fixes the spindles at selected balanced and mirroring locations along the length of the oblongated base. Fixed and mirrored positioning of the spindles with respect to the central axle channel facilities performance of the tool's balanced rotating yarn dispensation function.

In a preferred embodiment, second left and second right series of graduation indicia are displayed upon the opposite side of the oblongated base, such additional indicia beneficially allowing, for example, one of set of graduated indicia to signify yarn lengths in inches, and allowing the second oppositely arrayed indicia to signify the yarn lengths in centimeters.

Accordingly, objects of the instant invention include the provision of a skein measuring and dispensing tool which incorporates structures as described above, and which arranges those structures in relation to each other in the manners described above, for the achievement and performance of beneficial functions, as described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
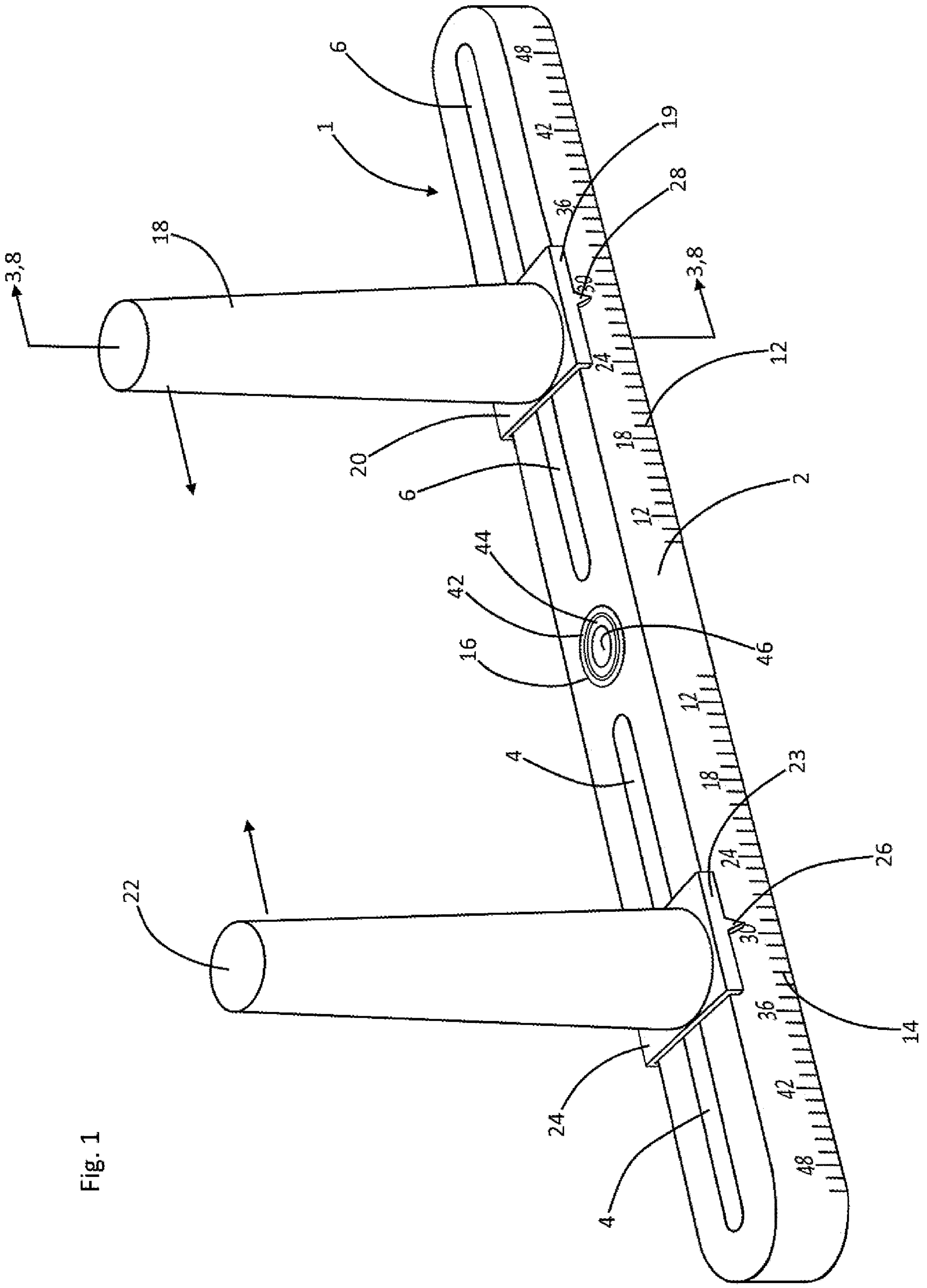
FIG. 1 is a perspective view of a preferred embodiment of the instant inventive skein measuring and dispensing tool.
Figure 2:
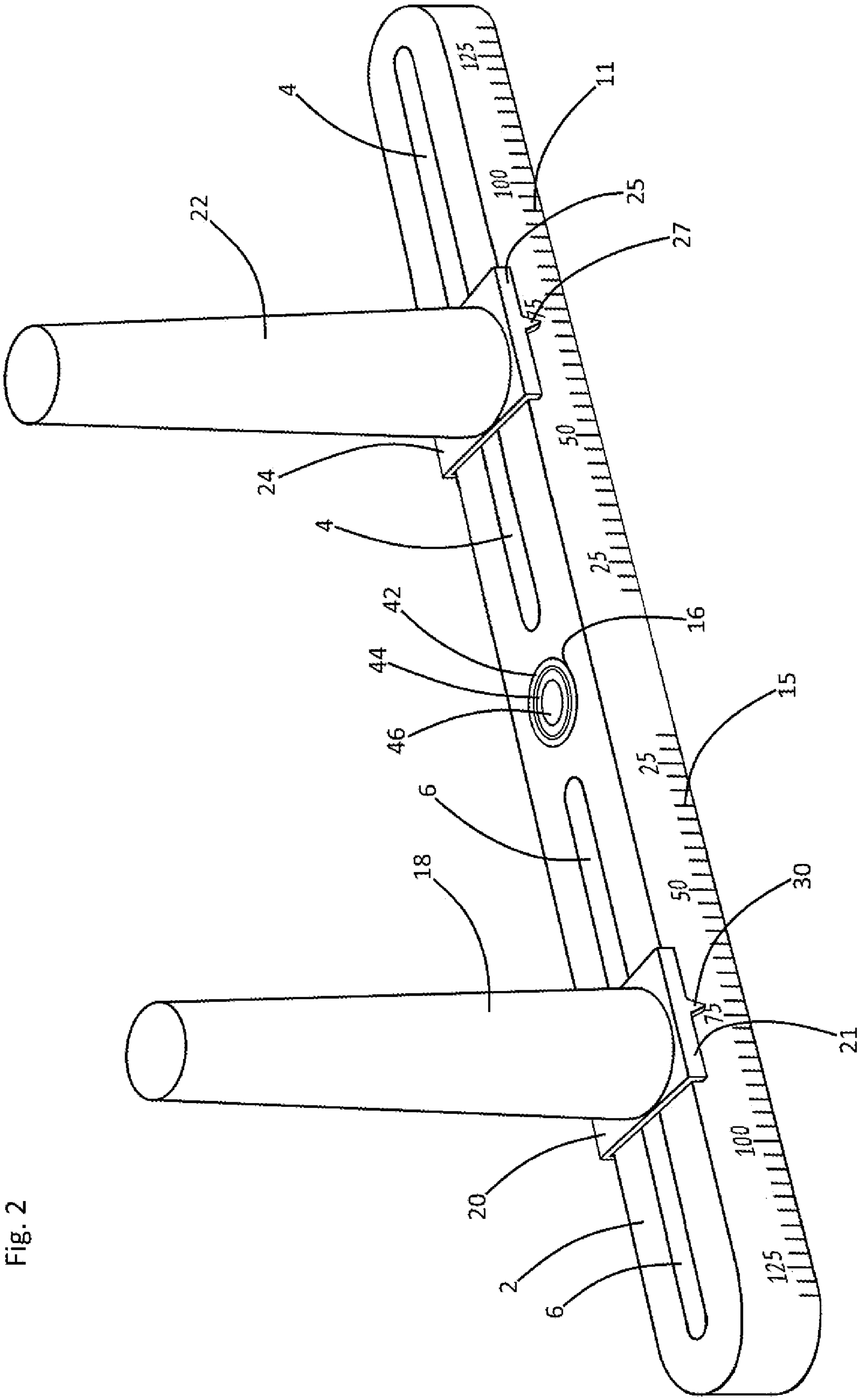
FIG. 2 is an opposite view of the structure of FIG. 1.
Figure 3:
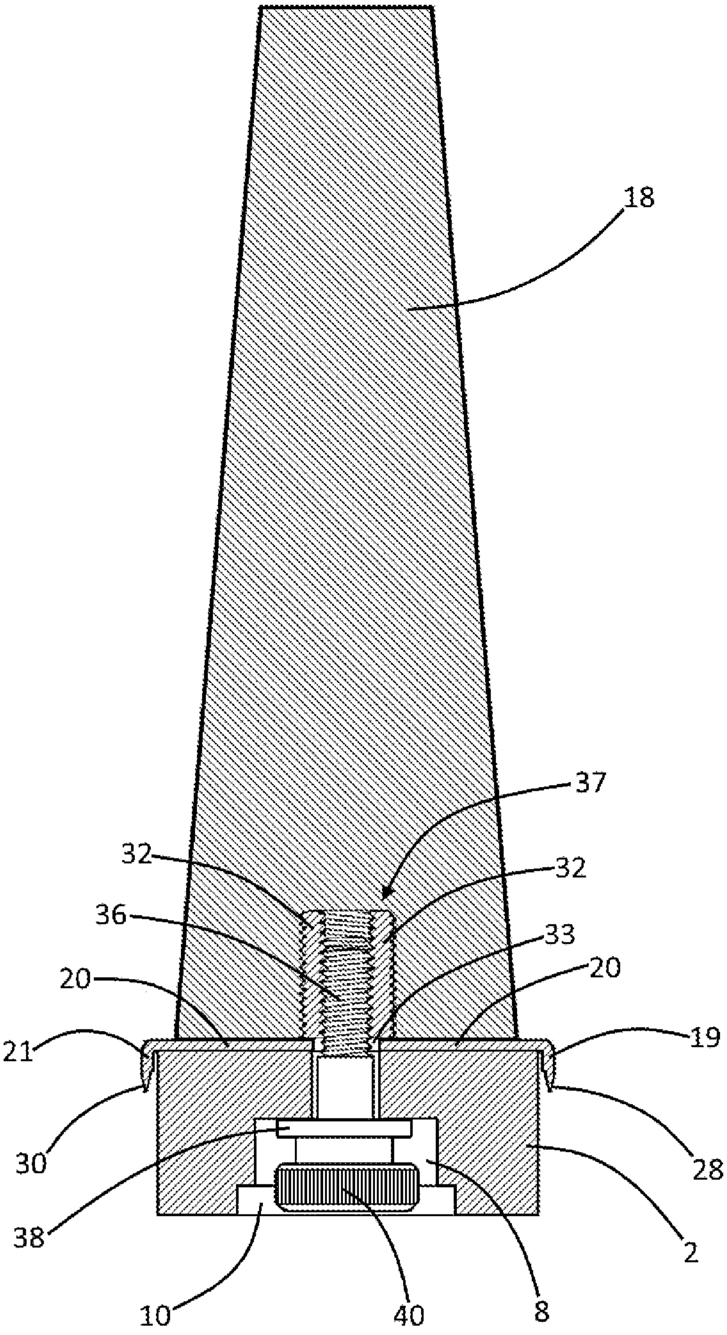
FIG. 3 is a sectional view of the structure of FIG. 1, as indicated in FIG. 1.

Referring now to the drawings, and in particular to Drawing FIGS. 1, 2, and 3, a preferred embodiment of the instant inventive skein measuring and dispensing tool is referred to generally by Reference Arrow 1. The tool 1 has an oblongated base 2 which preferably has a substantially centrally located axle channel or bore 46 extending from the upper surface or side of the base 2 to its lower surface or side.

Left and right travel slots 4 and 6 preferably extend vertically through the oblongated base 2, said slots respectively extending along the base 2 leftwardly and rightwardly from the axle channel 46. As can be best seen in FIG. 3, each of the travel slots 4 and 6 opens upwardly at the upper side of the oblongated base 2, and further opens downwardly at a lower end or surface of the oblongated base 2.

Left and right spindles 22 and 18 are preferably slidably mounted at the upper surface of the oblongated base 2. As indicated in FIGS. 1, 4, 6, and 7, such spindles are adapted for and are capable of mirroring movements along the base 2, alternatively or reciprocatingly toward each other. Such sliding motions are preferably guided and restricted by the left and right travel slots 4 and 6.

Left and right series of graduations 14 and 12 are preferably fixedly attached to or are displayed upon a side wall of the oblongated base 2, such graduations being mirroringly arrayed and with respect to each other so that each array radially extends along the oblongated base from the central axle channel 46. Mirroring inches indicia are suitably adjacently displayed in relation to the graduations 14 and 12, such indicia facilitating measurement of variously sized skeins of yarn received upon the tool 1. Left and right pointers 26 and 28 are preferably fixedly attached to or mechanically connected for motion with the spindles 22 and 18, such pointers progressively indicating inch indicia as the spindles 22 and 28 mirroringly move away from each other along the travel slots 4 and 6.

Referring simultaneously to FIGS. 2 and 3, a right slide plate 20 overlies the upper surface of the oblongated base 2, such plate spanning or bridging laterally across the right travel slot 6. The lateral and oppositely lateral edges of the slide plate 20 present oppositely positioned retainer flanges 19 and 21, such flanges preferably being formed wholly with lateral and oppositely lateral ends of the slide plate 20. In the depicted preferred configuration, the retainer flanges 19 and 21 in combination with the horizontally spanning slide plate 20 form a sliding "C" bracket which is fitted for nesting and slidable receipt of the upper end of the oblongated base. Pointers 28 and 30 are preferably formed wholly with lower edges of the flanges 19 and 21, such pointers variably pointing to and progressively indicating skein length measurements along first and second arrays of graduations or indicia 12 and 15 displayed upon the opposite side walls of the rightward end of the oblongated base 2. As shown in FIG. 3, the slide plate 20 has a central bolt passage aperture 33 which allows a bolt 36 to secure both the spindle 18 and the plate 20 to the base 2.

Similarly with the positioning of the right slide plate 20 beneath the right spindle 18, a left slide plate 24 is mirroringly positioned beneath the left spindle 22. The left slide plate is preferably configured substantially identically with the right slide plate 20, the left slide plate similarly having "C" channel forming flanges 23 and 25, and having oppositely positioned pointers 26 and 27. Such pointers 26 and 27 variably align with and point to mirroring first and second arrays of graduations or measurement indicia 14 and 11 scribed or printed upon the lateral and oppositely lateral sides of the left end of the base 2.

Referring to FIG. 3, the instant inventive tool preferably further comprises a right screw and threaded socket combination which is referred to generally by Reference Arrow 37. Such combination has an internally helically threaded socket 32 which is embedded within and opens downwardly from the lower or base end of the right spindle 18. The helically threaded screw component 36 of such combination extends vertically through travel slot 6 and through the slide plate aperture 33 to helically threadedly engage the socket 32. The lower end of the screw 36 preferably forms an enlarged finger turnable head 40 which is housed within downwardly opening channel enlargement sections 8 and 10. Upon clockwise turning of screw 36, an annular shoulder extending from the head 40 of the screw 36 bears against a travel washer 38 which is captured within channel section 8. Such screw turning action forcefully draws the socket 32 and the spindle 18 downwardly against slide plate 20 to securely fixedly position the spindle 18 at a selected position upon the oblongated base 2. Opposite turning and loosening of the screw 36 releases such spindle drawing action, allowing the spindle 18 to be slidably moved and repositioned along travel slot 6. A left or second helically threaded socket and screw combination is provided, such left combination preferably mirroring the right combination 37, the left combination similarly facilitating mirroring and balanced positioning and repositioning of the left spindle 22.

To facilitate smooth rotating yarn dispensing motion of the tool 1, the central aperture within the base 2 is preferably enlarged to present a bearing mounting aperture 16 which nestingly receives a rotary bearing assembly. Such assembly suitably comprises a fixed radially outer sleeve 42 which rotatably receives and retains a radially inner rotating sleeve 44. Ball bearings (not depicted within views) captured within races between sleeves 42 and 44 facilitate smooth rotating movement. Where such rotary bearing assembly is provided, the central bore 46 of the assembly comprises the tool's central axle channel component.

Figure 8:
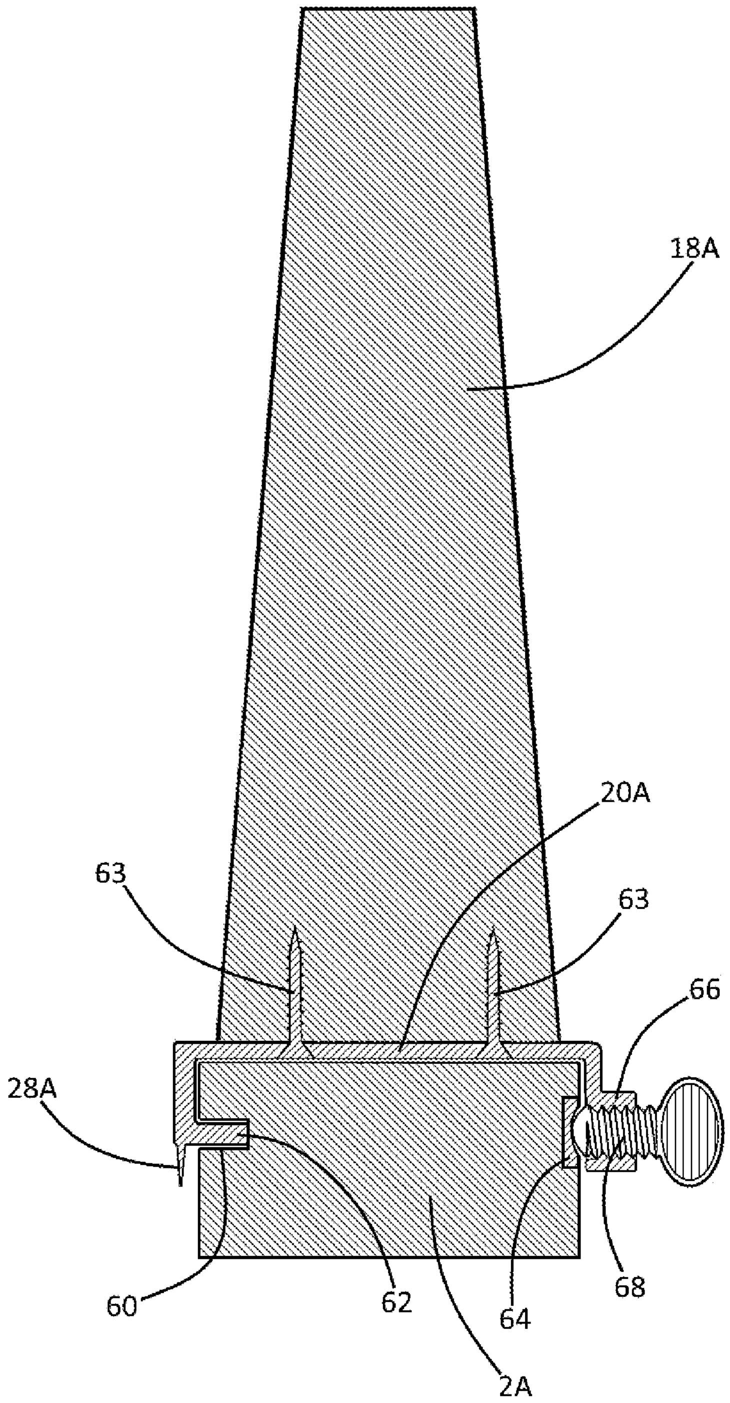
FIG. 8 presents an alternative configuration of the structure of FIG. 3, as indicated in FIG. 1.

Referring simultaneously to FIGS. 1, 3 and 8, all structures appearing in FIG. 8 which are identified by a reference numeral having a suffix "A" are configured substantially identically with similarly numbered structures appearing in other figures. In the FIG. 8 structural alternative, the vertically extending and vertically opening travel channels 4 and 6 of FIG. 1 are eliminated, and side wall travel channels 60 are provided in their place. In the FIG. 8 structural alternative, the instant invention's screw and socket combinations alternatively comprise a horizontally oriented set screw 68 which threadedly extends through helically threaded socket 66. Since such alternative screw and socket combination extends its screw parallel to the base of spindle 18A, it will not hold such spindle upon the slide plate 20A. To provide the needed spindle attachment, screws 63 extend through plate 20A to fixedly attach the spindle 18A to the upper surface of the slide plate 20A. Clockwise turning of set screw 68 drives its inner end against a side wall mounted contact plate 64, such screw action forcefully drawing a slide flange 62 into the alternatively configured right travel channel 60. The left spindle attachment assembly of the FIG. 8 structural alternative (not depicted within view) is preferably configured substantially identically and mirroringly with the configuration shown in FIG. 8.

Referring to FIGS. 1-4, in use of the instant inventive tool (in either its FIGS. 1-7 configuration or its FIG. 8 configuration) a user may apply finger pressure to turn screw heads 40 (or set screws 66, as the case may be) counter-clockwise, freeing the left and right spindles 22 and 18 for sliding movement along their travel channels 4 and 6 (or channels 60 as the case may be). Thereafter, the user may manually slidably move the spindles 18 and 22 toward each other, as indicated by the arrows drawn on FIG. 1, such motion moving the spindles 18 and 22 to central positions indicated in FIG. 4.

Figure 4:
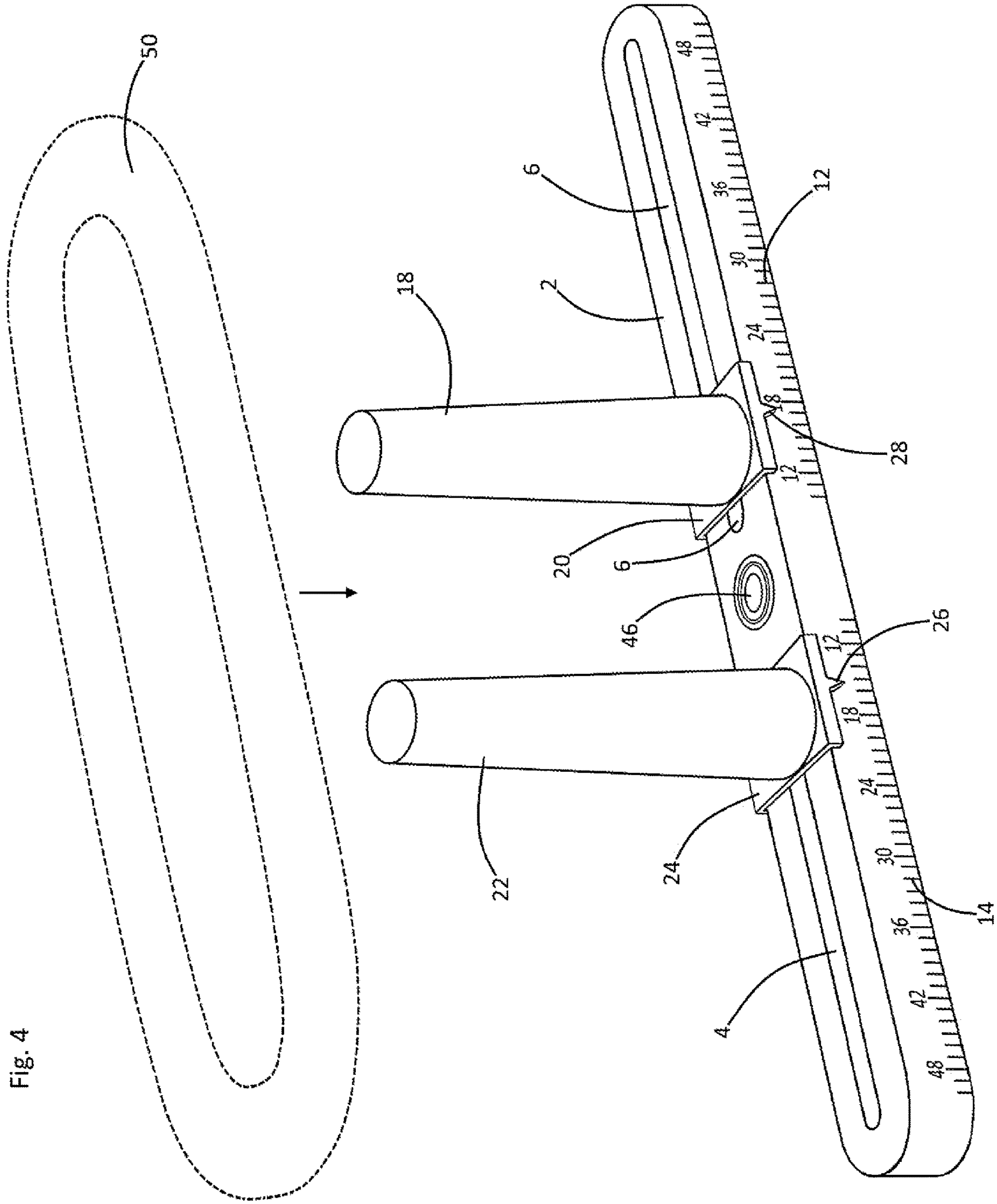
FIG. 4 re-depicts the structure of FIG. 1, the view of FIG. 4 showing spindle components slidably centrally moved and showing in representational view an overlying skein of yarn.
Figure 5:
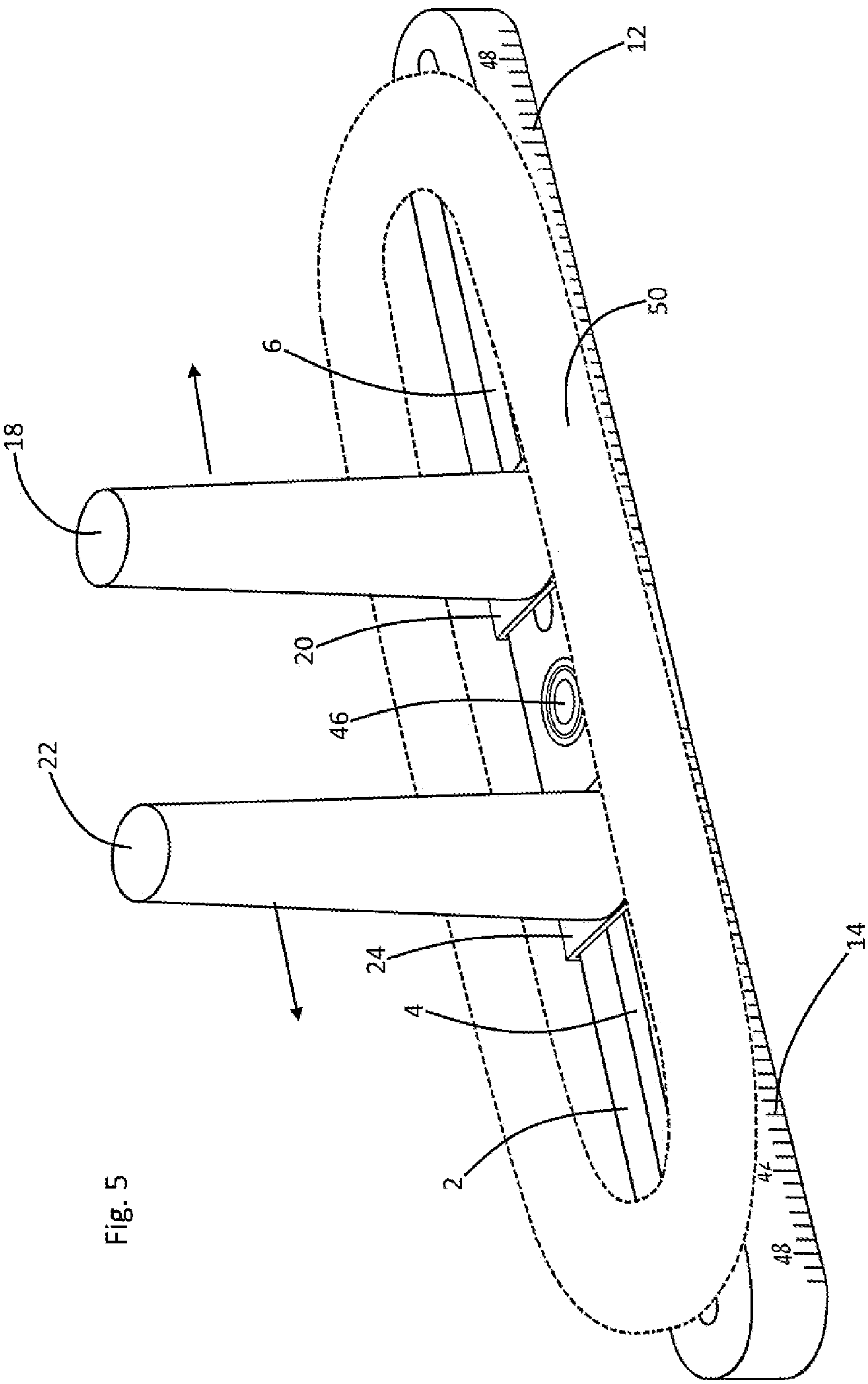
FIG. 5 re-depicts the structure of FIG. 4, the view of FIG. 5 showing the skein of yarn downwardly placed over the spindles.
Figure 6:
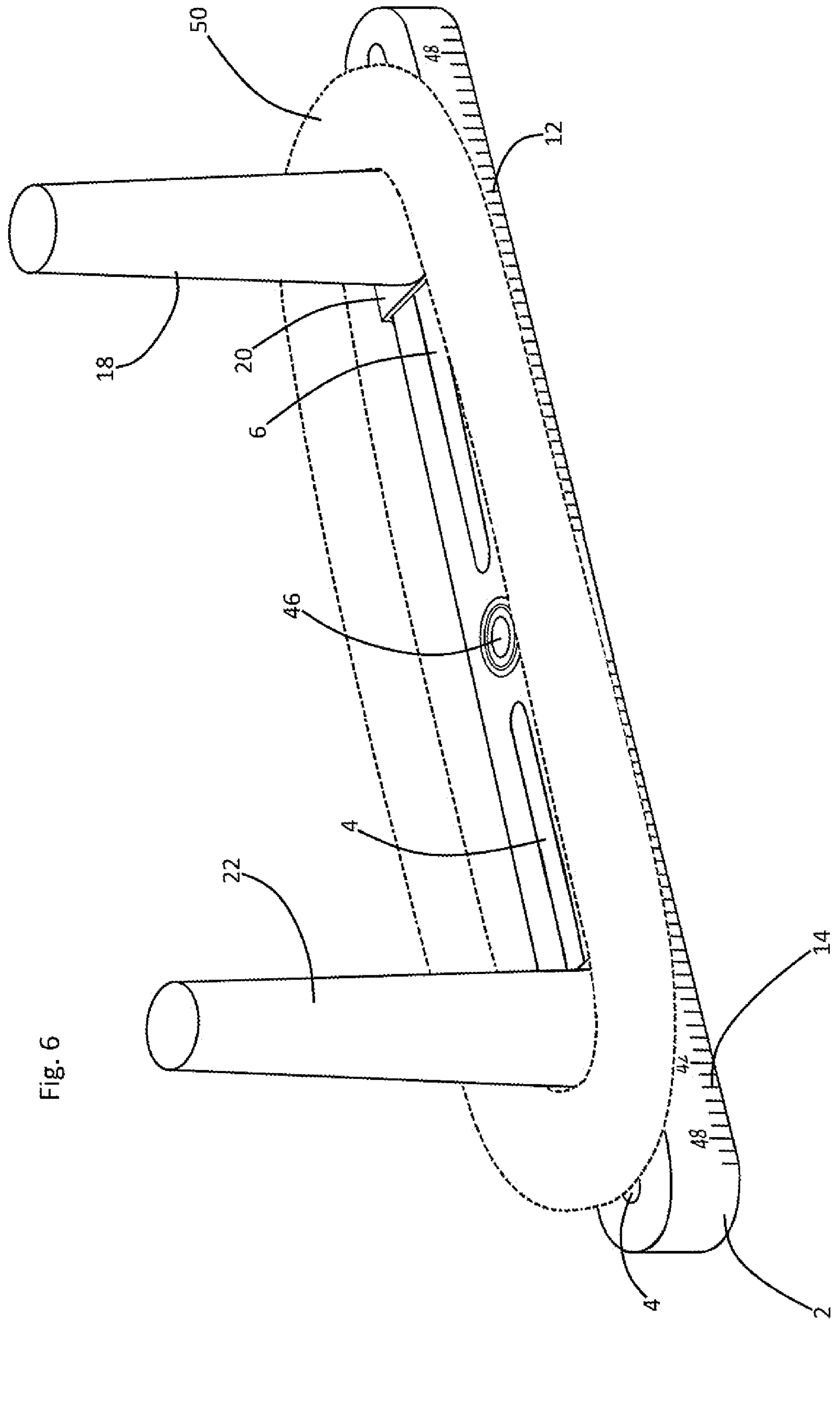
FIG. 6 re-depicts the structure of FIG. 5, the view of FIG. 6 showing the spindles slidably oppositely moved away from each other to skein measuring positions.

Thereafter, as indicated by FIGS. 4 and 5, a looped skein of yarn 50 may be downwardly placed over the spindles 18 and 22 until the skein 50 rests upon the upper surface of the base 2. Thereafter, the user may slidably and mirroringly move the spindles 18 and 22 away from each other, such motions being respectively rightwardly and leftwardly in the directions of the arrows drawn on FIG. 5. Such sliding motions preferably continue until the leftward and rightward faces of the left and right spindles 22 and 18 securely contact the opposing inner surfaces of the skein 50.

Thereafter, the user may observe the positions of pointers 26 and 28 with respect to graduation arrays 14 and 12. In the depicted example, the user may observe that such pointers extend toward and substantially overlie the mirroring 36 inches indicia. Thereafter (or preliminarily), the user may count the looped turns of the yarn within the skein 50. For example, upon counting 40 looped turns of yarn within the skein 50, the operator may simply multiply 40 by the pointer designated 36 inches, the product indicating that the length of yarn within the skein 50 is 1,440 inches or 120 feet. Referring further simultaneously to FIG. 2, a similar observation performed at the tool's oppositely lateral side may advantageously allow the user to note the positions of pointers 27 and 30 with respect to centimeter indicia overlying the oppositely lateral second graduation arrays 11 and 15. Such oppositely lateral observation alternatively indicates that the length of the yarn within the skein is 3,658 centimeters or 36.57 meters.

To allow the inventive tool to perform the above described yarn skein measuring function, the lateral and oppositely lateral graduations 12, 14 and 11, 15 and their respective adjacent inch and centimeter indicia are preferably arrayed along the base's side walls at increments which are directly proportional to actual measured distances between the spindles 18 and 22 and their outer circumferences. Such measured proportionality of the graduation arrays allows each of the pointers 26, 28, 27, 30 to designate the length of a single loop of yarn about the spindles.

Following such calculated measurement of the length of yarn within skein 50 in either inches or centimeters, the operator may add to or subtract from the yarn within the skein as needed. Thereafter, the operator may re-tighten, for example, screws 36 to fix the spindles 18 and 20 at their mirroring and centrally balanced positions upon the base 2. The centrally mirroring spindles 18 and 22, travel slots 6 and 4, and graduation arrays 12, 14 and 11, 15 advantageously assure that, upon completion of performance of the tool's skein measuring function, the skein 50 is substantially centrally positioned upon the tool's base 2. Such positioning facilitates balanced rotary dispensation of the yarn, as described below.

Figure 7:
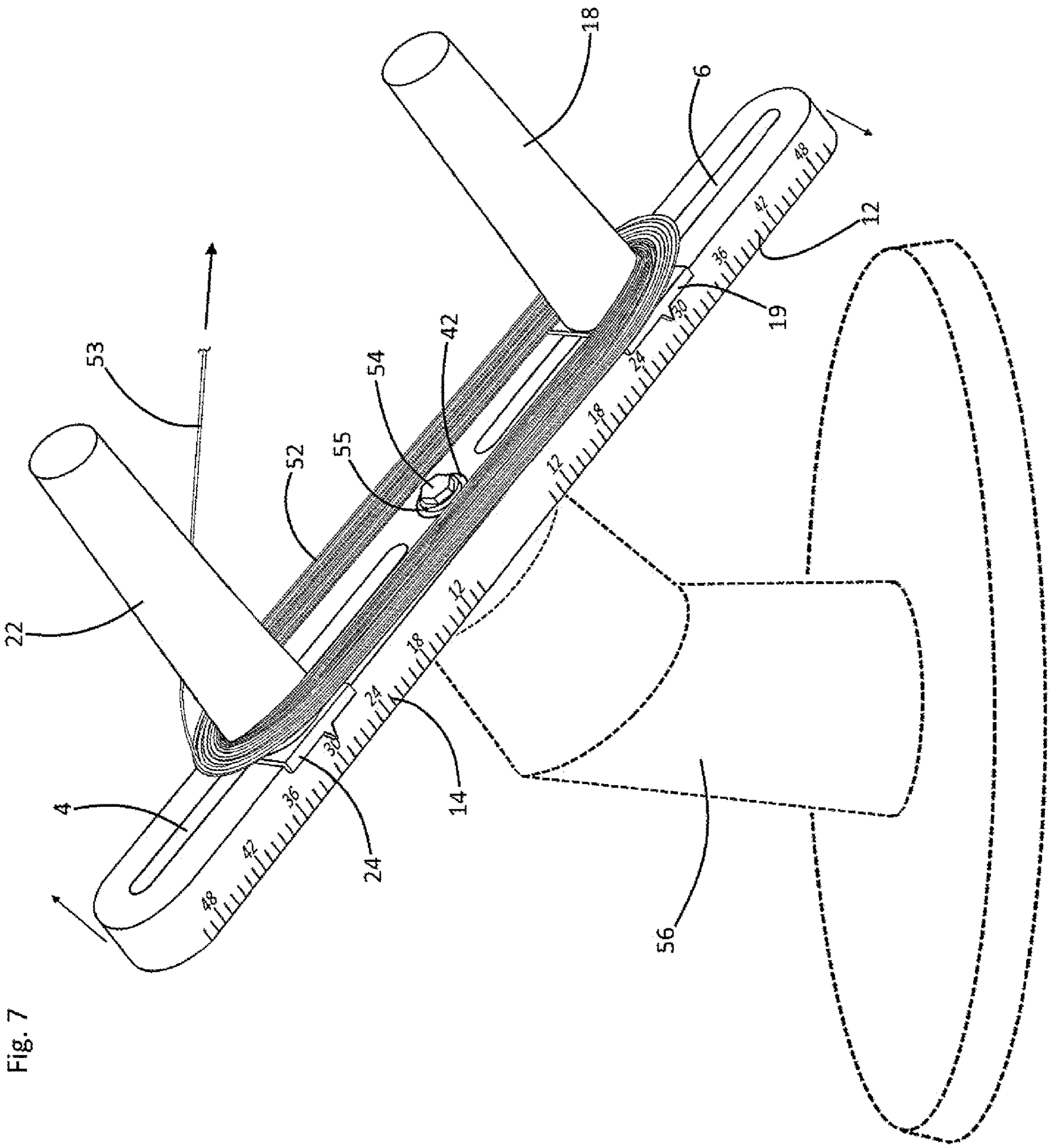
FIG. 7 shows the instant inventive tool in use during rotating dispensation of yarn from a skein, the tool being shown rotatably mounted upon an angled base.

Referring to FIG. 7, an exemplary smaller skein of yarn 52 is shown received upon the tool 1. Skein measuring steps described above may be preliminarily performed without disrupting the skein's balanced central position upon the base 2. In the example of FIG. 7, the tool is angularly and rotatably mounted upon a yarn dispensing base stand 56. The depicted angled orientation of the tool provided by stand 56 beneficially allows the skein 52 to be retained by gravity upon the spindles 18 and 22 while allowing relatively upward dispensation of the yarn strand 53. In mounting the tool 1 upon such stand 56, a helically threaded bolt 54 may extend axially through bore 46, such bolt and its washer 55 capturing the central rotating member 44 of the rotary bearing assembly without frictionally contacting such assembly's fixed outer bearing sleeve 42. Such bolted attachment advantageously allows the tool 1 to freely rotate about the bolt 54 in the direction shown by arrows drawn upon FIG. 7. A relatively upwardly angled pull upon yarn strand end 53 in the direction associated with the arrow drawn at such yarn end causes the yarn to progressively dispense from the skein 52. During such dispensation, the spindles 18 and 22 orbit the central axis of the tool in a balanced rotary fashion, advantageously allowing for smooth and uninterrupted dispensation of the yarn 53.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A skein measuring and dispensing tool comprising:

(a) an oblongated base having an upper end, a lower end, and a centrally positioned axle channel, said axle channel opening upwardly and downwardly at the oblongated base's upper and lower ends;

(b) left and right travel slots within the oblongated base, said slots respectively extending leftwardly and rightwardly from the axle channel;

(c) left and right spindles slidably mounted upon the oblongated base, said spindles being adapted for movements toward each other, said movements respectively being along the left and right travel slots;

(d) left and right series of graduations, said left series' graduations being arrayed leftwardly from the axle channel and said right series' graduations being arrayed rightwardly from the axle channel; and (e) left and right pointers respectively mounted for movements with the left and right spindles, said pointers being positioned for, upon the movements of the left and right spindles along the left and right travel slots, successively aligning with graduations among the left and right series of graduations.

2. The skein measuring and dispensing tool of claim 1 further comprising left and right screw and threaded socket combinations, wherein said combinations' screws respectively extend through the left and right travel slots, and wherein said combinations' threaded sockets respectively open at lower ends of the left and right spindles.

3. The skein measuring and dispensing tool of claim 1 further comprising a rotary bearing within the axle channel, wherein said bearing is centrally positioned upon the oblongated base.

4. The skein measuring and dispensing tool of claim 1 wherein the left and right series of graduations are substantially mirroringly identical to mirror each other.

5. The skein measuring and dispensing tool of claim 4 wherein the left and right series of graduations are adapted for measuring lengths in inches or in centimeters.

6. The skein measuring and dispensing tool of claim 4 further comprising a second left and a second right series of graduations, said second series of graduations being positioned upon the oblongated base oppositely from the left and right series of graduations.

7. The skein measuring and dispensing tool of claim 6 wherein the left and right series of graduations are adapted for measuring inches and wherein the second left and second right series of graduations are adapted for measuring centimeters.

8. A skein measuring and dispensing tool comprising:

(a) an oblongated base having an upper end, a lower end, and a centrally positioned axle channel, said axle channel opening upwardly and downwardly at the oblongated base's upper and lower ends;

(b) left and right travel slots within the oblongated base, each slot among the left and right travel slots having an upper opening and a lower opening, wherein each opening among the left and right travel slots' upper openings is positioned at the upper end of the oblongated base, wherein each opening among the left and right travel slots' lower openings is positioned at the lower end of the oblongated base, wherein the right travel slot extends rightwardly from the axle channel, and wherein the left travel slot extends leftwardly from the axle channel;

(c) left and right spindles slidably mounted upon the oblongated base, said spindles being adapted for respective movements along the left and right travel slots;

(d) left and right series of graduations, said left series' graduations being arrayed leftwardly from the axle channel and said right series' graduations being arrayed rightwardly from the axle channel; and (e) left and right pointers respectively mounted for movements with the left and right spindles, said pointers being positioned for, upon the movements of the left and right spindles along the left and right travel slots, successively aligning with graduations among the left and right series of graduations, wherein the left travel slot further extends through the oblongated base, said extension spanning between the upper and lower ends of the oblongated base, and wherein the right travel slot further extends through the oblongated base, said extension spanning between the upper and lower ends of the oblongated base.

9. The skein measuring and dispensing tool of claim 2 further comprising left and right slide plates overlying the oblongated base, said plates respectively underlying the left and right spindles.

10. The skein measuring and dispensing tool of claim 3 wherein the left and right pointers are respectively fixedly attached to and respectively extend from the left and right slide plates.

* * * * *